United States Patent [19]

Davies et al.

[11] Patent Number: 4,994,749
[45] Date of Patent: Feb. 19, 1991

[54] LIQUID SENSOR WITH HIGH SENSITIVITY NEAR EMPTY

[75] Inventors: Keith Davies, Robbinsville, N.J.; William H. Meise, Wrightstown Township, Bucks County, Pa.

[73] Assignee: General Electric Company, East Windsor, N.J.

[21] Appl. No.: 285,698

[22] Filed: Dec. 16, 1988

[51] Int. Cl.$^5$ ............................................. G01N 27/00
[52] U.S. Cl. .................................. 324/637; 73/304 R; 324/647; 324/71.1; 340/620
[58] Field of Search .............. 324/58.5 R, 61 R, 61 P, 324/58.5 A, 71.1, 637, 647; 73/304 C, 304 R; 340/612, 618, 620; 333/263, 245, 246

[56] References Cited

U.S. PATENT DOCUMENTS

| | | | |
|---|---|---|---|
| 3,935,739 | 2/1976 | Ells | 324/61 R X |
| 4,003,259 | 1/1977 | Hope | 73/304 C |
| 4,510,436 | 4/1985 | Raymond | 324/61 R X |
| 4,543,823 | 10/1985 | Nagy et al. | 324/58.5 R X |
| 4,599,888 | 7/1986 | Hufton et al. | 324/61 R X |
| 4,754,214 | 6/1988 | Bramanti et al. | 324/58.5 R X |
| 4,786,857 | 11/1988 | Mohr et al. | 324/58.5 R X |
| 4,799,174 | 1/1989 | Kramer et al. | 324/58.5 R X |

OTHER PUBLICATIONS

IEEE Standard Dictionary of Electrical and Electronic Terms, Second Edition, ANSI/IEEE Std 100-1977, pp. 83, 84, and 739.

Primary Examiner—Gerard R. Strecker
Assistant Examiner—Robert W. Mueller
Attorney, Agent, or Firm—Clement A. Berard, Jr.; William H. Meise

[57] ABSTRACT

A fuel or fluid level measurement arrangement for a spacecraft includes one or more electromagnetic transmission lines extending into the reservoir. The presence of fuel adjacent the transmission line changes the dielectric constant or loss characteristics of the transmission line(s) in a measurable manner. In one embodiment, strip transmission lines extend parallel to the fluid surface at various degrees of ullage, and the fuel level can be established to within the spacing between the transmission lines.

18 Claims, 4 Drawing Sheets

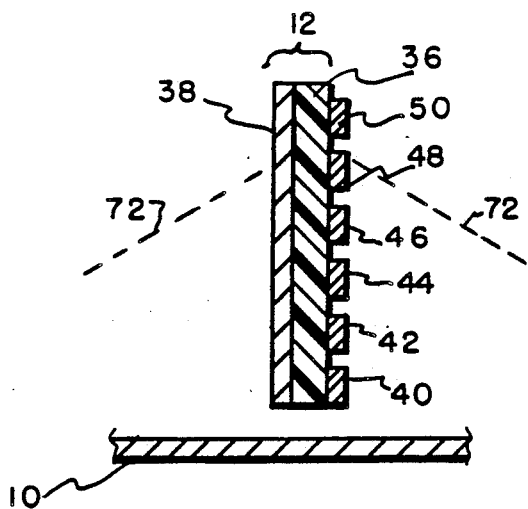
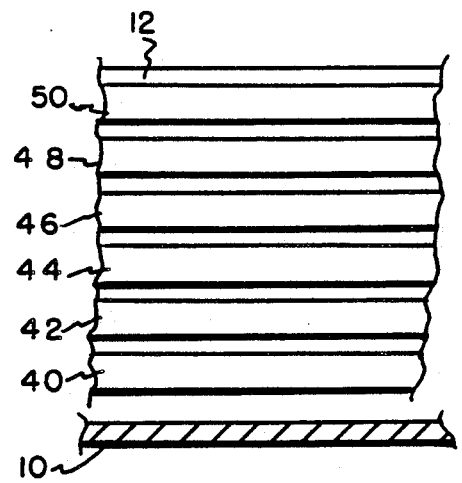
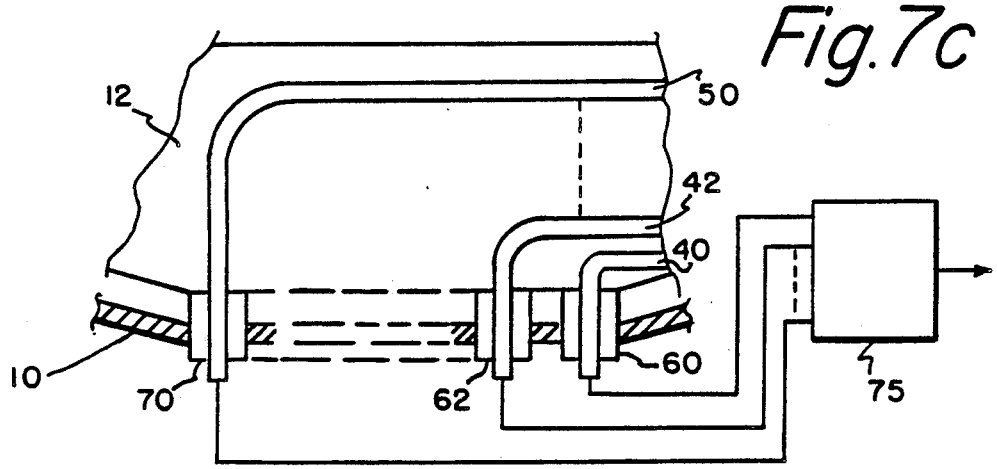
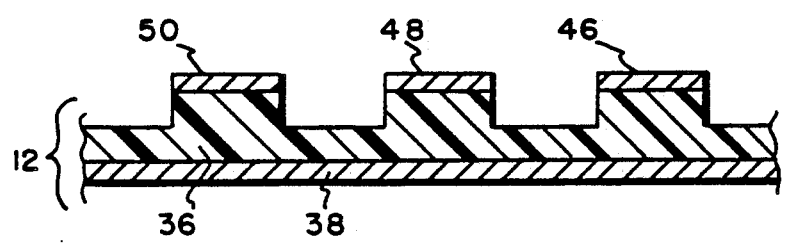
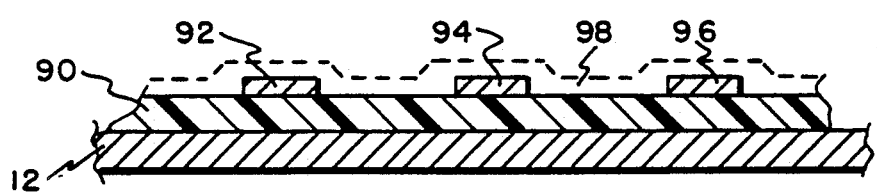

LIQUID SENSOR WITH HIGH SENSITIVITY NEAR EMPTY

BACKGROUND OF THE INVENTION

This invention relates to liquid sensing arrangements, and more particularly to such arrangements using electromagnetic sensors.

In many situations, it is much more important to accurately know the amount of liquid in a container when the container is near empty than when it is near full. The problem is particularly acute where an undesirable event accompanies the exhaustion of the liquid and/or where contentional measuring techniques, such as a narrow bottom portion of a container in which the remaining liquid pools, do not work.

One example of where all the foregoing exist is in a satellite attitude control system employing gas jets or thrusters. Gas for the jets or fuel for the thrusters is usually stored in liquid form in containers or tanks on the satellite. When the gas or fuel is used up, most satellites become inoperative, or at least suffer significantly degraded capability. Moreover, without gravity to pool the liquid in the tank it tends to distribute itself in response to other forces. Fuel is generally used herein to denote the fluid contents of the container, whether or not the liquid would strictly be considered fuel.

The length of time that a particular load of fuel will provide stationkeeping for a satellite cannot be predicted exactly, because it depends upon environmental conditions, such as solar wind pressure and magnetic fluctuations. Furthermore, the exact amount of fuel used during each maneuver also depends upon the exact characteristics of controllers, which may vary slightly with time and environment. Thus, the exact amount of fuel remaining in a spacecraft becomes less well known as time progresses, unless a suitable measurement scheme is used.

At the end of life of a geostationary satellite, for example, the remaining fuel is used to remove it from its assigned orbital position so that a replacement satellite may be inserted into that orbital position. So long as the old satellite is given enough velocity to vacate the regions of interest, it is irrelevant how much additional velocity it is given. If the amount of fuel remaining in the tanks at the time it is ejected from its orbital position exceeds that necessary, the excess fuel could have been used for additional useful time in orbit. Because the amount of fuel required for stationkeeping is very small, months of potential stationkeeping time could be wasted if the ejection from orbital position occurs too early. On the other hand, if the decision is made too late, there may be insufficient fuel to cause the satellite to be removed from its orbital position, and the orbital position it occupies may not be usable for a replacement satellite.

Communication satellite weight is tightly controlled in order to provide the largest possible load of fuel for stationkeeping, thereby obtaining the longest possible useful life. For a satellite with 24 transponders which are polarization-multiplexed to provide 48 effective communication channels, the value of additional usable fuel may be several million dollars per additional month of useful life.

Thus, it is very advantageous to be able to determine the amount of remaining fuel. The measurement, however, is rendered complex because under weightless conditions, the fuel spreads through the tank. In order to prevent the fuel from forming into balls spread throughout the tank, the tanks include one or more thin circumferential bands near the inner surface of the tank. These bands capture the central bubble which tends to form, holding the remaining fuel against the outer walls and the bands.

Since the remaining fuel near the end of life has a relatively small volume compared with the volume of the tank, measurement methods which compare volume lack sensitivity near the end of spacecraft life, when the tank approaches empty, which is when the accuracy is most needed. Similarly, methods which depend on the mass of fuel lack sensitivity because of the increasing effect of the mass of the tank and surrounding objects. The extremely irregular shape of the fuel as it adheres by surface tension to the tank and the circumferential bands further complicates the problem. Yet further, the size and weight of a fuel sensor should not be so great that the additional fuel which it displaces from the spacecraft exceeds the additional amount of fuel rendered usable by knowledge of the actual amount of remaining fuel.

SUMMARY OF THE INVENTION

An electromagnetic transmission line arrangement that extends into a container has an electromagnetic field extending into the liquid therein. The characteristics of the transmission line arrangement are affected by a characteristic of the liquid, such as the dielectric constant and/or the loss characteristics. The transmission line arrangement is energized and its characteristics measured to establish the amount of remaining liquid.

DESCRIPTION OF THE DRAWING

FIGS. 7a, 7b, and 7c are elevation, cross-section and another elevation view, respectively, of another embodiment of the invention in which the vane is a metalized dielectric defining numerous microstrip transmission lines;

FIG. 8 is a detail of FIG. 7b illustrating a modification for more sensitivity; and FIG. 9 illustrates an arrangement for modifying a present vane for the invention.

DESCRIPTION OF THE INVENTION

Figure 1:
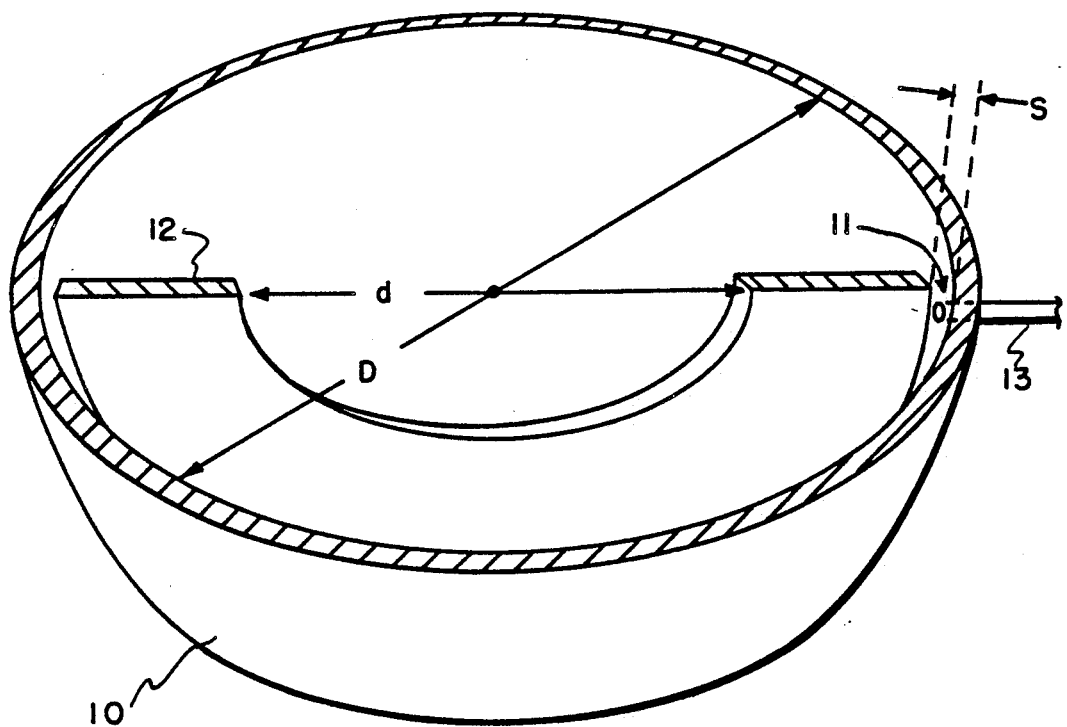
FIG. 1 is a perspective or isometric view of a spherical fuel tank partially cut away to reveal an inner band or vane to which the fuel adheres by surface tension effects.

FIG. 1 is a perspective or isometric view of a spherical fuel tank 10, partially cut away to reveal an inner peripheral vane or belt 12. The outer edge of vane 12 is spaced by a small gap 11, typically having a space S of a few thousandths of an inch, from the inner surface of tank 10 which has a diameter D. The inner portion of vane 12 defines a circle, only half of which can be seen, having a diameter d. Inner diameter d of vane 12 is preferably selected to approximately equal the diameter of the bubble remaining within the fuel tank after it is loaded with its initial charge of fuel. The bubble may but need not contain a pressurizing gas.

In space, where gravitational forces are low or essentially zero and surface tension forces dominate, the bubble attaches itself to the inner edge of vane 12 because it attempts to minimize its surface area. As the fuel is consumed and the bubble grows, it remains attached to the vane. Viewed in another manner, the fuel adheres or clings to the walls and to the vane.

The spacing of vane 12 from tank 10 by gap S tends to hold the last bit of fuel between the vane and the surface of the tank by surface tension. A fuel outlet 13 communicates through the wall of the tank 10 to the gap 11 so as to draw out the last remaining bit of fuel.

Figure 2A:
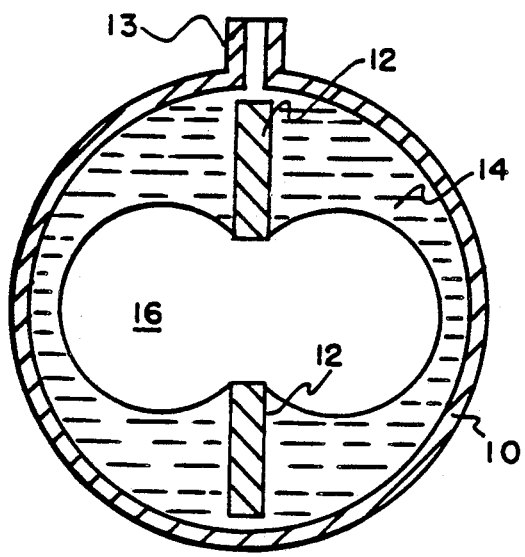
FIGS. 2a, b, and c illustrate in cross-section the tank and vane of FIG. 1 showing the fuel distribution under various conditions of ullage, the thickness of the vanes is exaggerated for clarity.
Figure 2B:
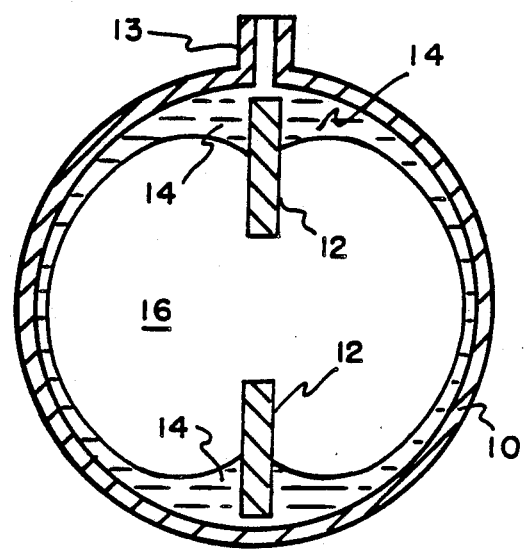
Figure 2C:
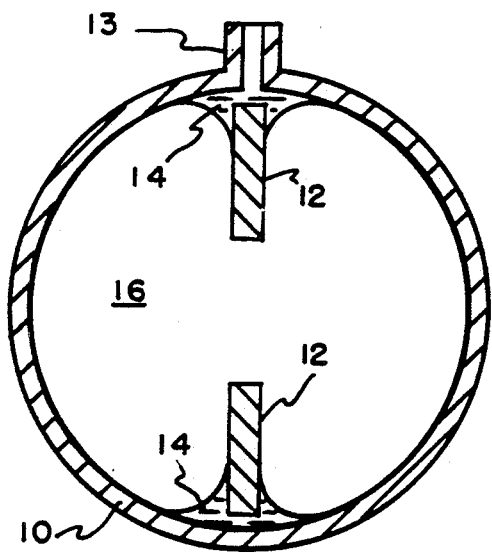

FIG. 2a illustrates a cross-section of tank 10 and vane 12 with substantial fuel remaining, and FIG. 2b illustrates the same cross-section with less fuel remaining, and FIG. 2c illustrates minimal fuel. (Thicknesses of the tanks and vanes in the FIGURES are not to scale.) In FIG. 2a, the fuel charge is indicated by 14 and the ullage in the form of a deformed spherical bubble by 16. In FIG. 2b, the fuel against the inner surface of tank 10 has minimal thickness, but near vane 12 the presence of two surfaces to which the fuel can adhere creates a meniscus-like accumulation. In FIG. 2c the remaining fuel has migrated into the thin gap S and adheres to the edge of the vane and the adjacent wall surface of tank 10, from where it may be drawn via outlet 13.

Figure 3:
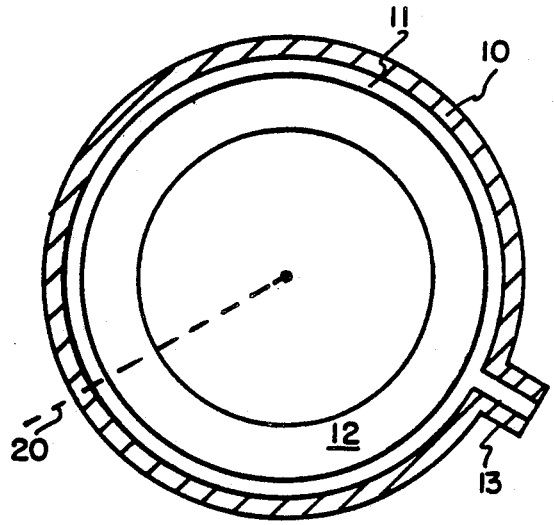
FIG. 3 is an elevation view of the vane of FIGS. 1 and 2 in a section of the tank.

FIG. 3 is a cross-sectional view of tank 10 showing the plan view of the vane 12 therein and the circular gap 11 communicating with outlet 13.

Figure 4:
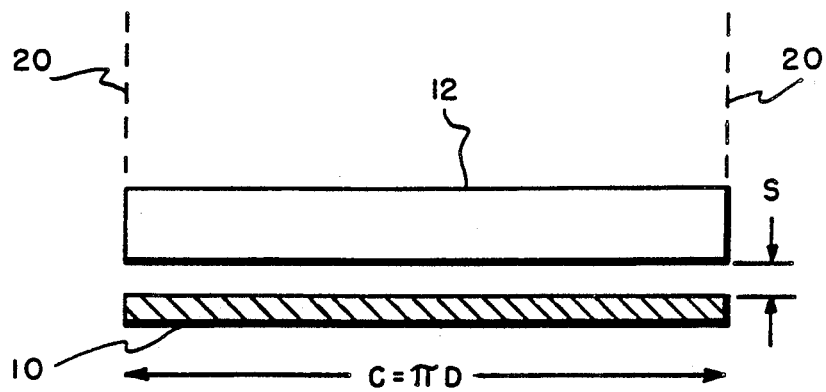
FIG. 4 is a developed view of the arrangement of FIG. 3.

FIG. 4 is a developed view of the vane and tank of FIG. 3. In effect, FIG. 4 is the structure of FIG. 3 cut along dashed line 20 and unfolded or straightened. While this can be done for purposes of explanation, it obviously cannot be done to a physical tank and vane. In FIG. 4, it can be seen that the structure resembles a strip transmission line: with a strip formed by vane 12 spaced by gap S from a large ground plane formed by the wall of tank 10. The length of the line is the circumference C equals pi times the diameter D of tank 10.

Figure 5:
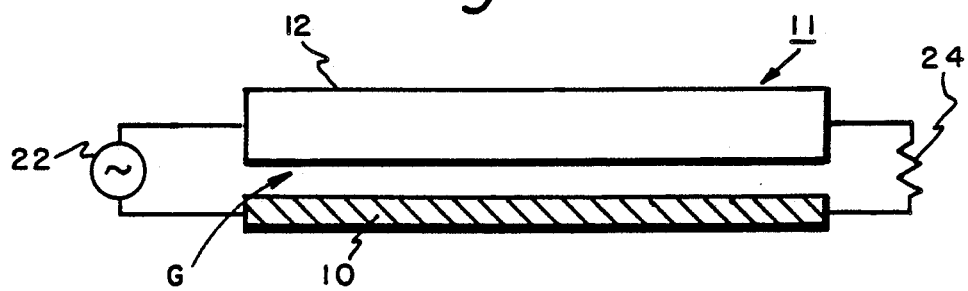
FIG. 5 illustrates the arrangement of FIG. 4 connected as a transmission line.

FIG. 5 illustrates the developed structure of FIG. 4 with the addition of a signal source 22 which may be a microwave signal source. This arrangement is convenient in a spacecraft, because a low-power microwave source is readily available for other purposes in the spacecraft, and vane 12 in the prior art provides a mechanical function, not an electrical function. Therefore, vane 12 may be made of any material with suitable mechanical properties, so long as a portion is conductive and a portion (at the cut line 20 of FIG. 3 or the left and right extremes of FIG. 4) is nonconductive. Thus, vane 12 could be made from appropriately metallized plastic.

With the arrangement of FIG. 5, the gap G between the ground-plane tank 10 and the conductive vane 12 will contain fuel when the tank contains fuel, but will be empty when all the fuel is consumed. Since the fuel has dielectric and/or loss characteristics different from vacuo, various characteristics of the transmission line 11 thus formed vary depending upon the presence or absence of fuel. In the presence of fuel, the dielectric constant of the fuel increases the effective capacitance between vane 12 and tank 10, thereby decreasing the characteristic impedance of the transmission line 11 thus formed. If a measurement is made of characteristic impedance, the presence or absence of fuel in the gap, if not the fuel charge remaining, can be determined.

However, a characteristic impedance measuring apparatus may be too bulky, heavy or complex. If a load impedance 24 is connected to the arrangement of FIG. 5 and is matched to the characteristic impedance established by the strip 12 and ground plane 10 structure, power will flow from source 22 to load 24 in ordinary transmission line mode. If the characteristic impedance of load 24 differs from that of transmission line 11, the power will decrease as reflections occur at the junction between transmission line 11 and load 24. If load resistor 24 includes or is part of a power measurement system, a direct indication of the presence or absence of fuel in the gap of transmission line 11 is possible.

Figure 6:
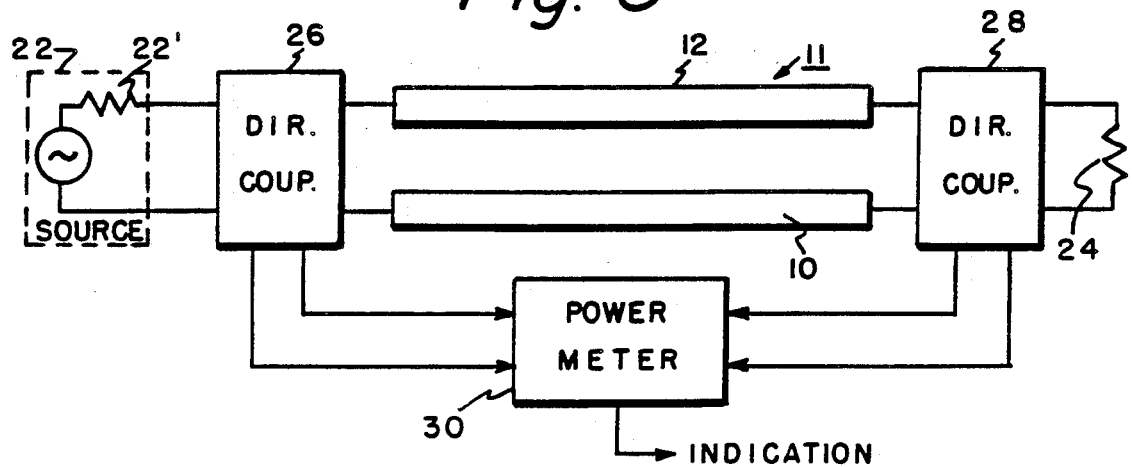
FIG. 6 illustrates connections to the transmission line of FIG. 5.

The presence of reflections of signal is known to perturb the voltages at the source and load. Consequently, the arrangement of FIG. 6 uses directional couplers to reduce the effects of reflection. In FIG. 6, source 22 includes an internal resistance 22' equal to that of transmission line 11 in the presence of fuel in the gap between strip 12 and ground plane 10. This may be 50 ohms, for example, a standard impedance for which equipment is readily obtainable. A 50-ohm directional coupler 26 couples most of the power to transmission line 11, and a sample of known lesser power to a power meter or indicator 30. A 50-ohm directional coupler 28 coupled between the output of transmission line 11 and load 24 couples most of the power received from transmission line 11 to load 24 and a predetermined portion to power indicator 30. Power indicator 30 may be a simple diode detector which may be coupled alternately to receive signal from directional couplers 26 and 28.

In the presence of fuel in the gap of transmission line 11, and with transmission line 11 dimensioned to have, for example, a 50-ohm impedance under this condition, a matched system exists, and directional couplers 26 and 28 will each receive about the same amount of power. If each has the same coupling factor (for example, 10 dB), power indicator 30 will show the same output when connected alternately to directional couplers 26 and 28. In the absence of fuel, however, a mismatch exists, and the relative powers will differ and cause differing outputs from indicator 30, thereby indicating no fuel in the gap.

As thus far described, only one indication is possible, namely the presence or absence of fuel in the gap which is the last bit of fuel before the spacecraft is without fuel. The arrangement of FIG. 7 provides indications for various different levels of fuel. In FIG. 7a, vane 12 is formed from a metallized dielectric 36. The pattern of metallization includes a ground plane 38 and a plurality of strips 40, 42, 44, 46 . . . 50. FIG. 7b is an elevation view, showing that metallization portions 40 . . . 50 are elongated and mutually parallel. FIG. 7c shows each of strip conductors 40 . . . 50 coupled through tank wall 10 by coaxial feedthrough connectors 60 . . . 70 (only connectors 60, 62 and 70 are illustrated) which prevent fuel leakage, and couple ground plane 10 to ground plane 38 and the center conductor to the associated strip 40 . . . 50. Thus, any of the strips 40 . . . 50 may be energized independently of any of the others. The remote ends of the strips may also be coupled through wall 10 in a manner similar to that shown in FIG. 7c.

Each of the coaxial connectors is electrically connected to a circuit device 75, such as a multiplexer which selectively connects the pairs of strips to source and load devices. In the FIG. 6 arrangement, if device 75 were a multiplexer, for example, one multiplexer could be interposed between transmission line elements 10 and 12 (and the other strips) and directional coupler 26 on the one end, and another multiplexer could be interposed between the other ends of elements 10 and 12 (and the other strips) and coupler 28. Alternatively, device 75 could continuously respond to the signals on each pair of strips forming transmission lines, the indication being generated by a comparison of such signals.

It is well known that two parallel strip conductors such as those illustrated in FIG. 7 have a coupling which changes depending upon the dielectric constant of the separating medium. The presence of fuel rather than vacuo, vapor, or pressurizing gas causes such a change. Other factors are also involved, such as operating frequency, the length of the strips and their relative impedance levels, but these are design constants which may be controlled. When the fuel is at a particular level, such as the level indicated by dashed line 72, there is no fuel in the gap between strips 48 and 50, so the coupling between the two will be low. On the other hand, there will be relatively high coupling between strips 44 and 46, between 42 and 44, and between 40 and 42. Thus, the level of fuel is known to within the width of one strip and gap.

FIG. 8 is a cross-section of a modification of the arrangement of vane 12 shown in FIG. 7 in which the dielectric material 36 is cut away between metallization strips 46, 48, 50, etc. to enhance sensitivity to the presence of fuel.

FIG. 9 illustrates an arrangement in which a dielectric strip 90 having metallized conductors 92, 94, 96 is adhesively affixed to the existing vane 12 of tank 10. Vane 12 in this arrangement may be a metal or other conductive material, of which titanium is frequently employed due to its light weight and high strength. Such a metallized strip is very light weight and displaces almost no fuel.

Other embodiments of the invention will be apparent to those skilled in the art. For example, the fuel tends to accumulate in corners of crossed vanes in a hyperbolic shape. The transmission lines may be curved to follow the expected shape, to give a more positive indication of level. Any characteristic of a transmission line may be measured, such as effective length, capacitance, characteristic impedance, mutual coupling, loss, etc. While measurement of "fuel" has been described, the invention is equally applicable to measurement of oxidizers or other fluids, as well as to tanks having other than spherical shape and to tanks without vanes.

In addition, it is contemplated, for example, that gap 11 need not be uniform. In FIG. 3, for example, one might make the gap smaller in the vicinity of outlet 13 and larger at points remote therefrom. Any effect this nonuniform gap might have on the fuel level measurement can be eliminated when the measurement arrangement is calibrated.

Moreover, the fluid need not be nonconductive if a thin, low-dielectric coating, such as layer 98 in FIG. 9, is employed to insulate the fluid from the conductors of the transmission line.

What is claimed is:

1. An arrangement for measuring the amount of liquid in a storage tank and adapted for use in a low gravity environment, which tank has a curved cross-section in at least one plane, said arrangement comprising:

a flat vane in the form of an annulus defining inner and outer edges, said vane being supported within said tank with said outer edge contiguous with the inner surface of said tank in said plane, wherein absent a dominant gravitational force said liquid will tend to accumulate in a region about said outer edge;

a plurality of elongated, open electromagnetic transmission lines, each including at least one elongated conductor, each of said transmission lines extending into said tank and, within said tank, extending in a curve which is in a substantially parallel relationship to at least one of said inner and outer edges of said vane, whereby each of said transmission lines extends in a curve substantially parallel to an expected surface of said liquid, and whereby each of said transmission lines is loaded by the presence of said liquid when said tank is full, and whereby each in turn is completely unloaded at a predetermined ullage condition of said tank; and means coupled to said transmission lines for individually measuring a characteristic of each of said transmission lines which depends upon the loading by adjacent liquid.

2. An arrangement according to claim 1 wherein said vane is electrically conductive, and forms, in conjunction with each of said elongated conductors, one of said plurality of transmission lines.

3. An arrangement according to claim 1 further comprising thin, flat dielectric means supported by said vane and mechanically coupled to said elongated conductors for support thereof, whereby said elongated conductors are mechanically supported by said vane.

4. An arrangement according to claim 1 wherein said outer edge of said vane is spaced away from said wall of said tank to thereby define a gap, said vane, gap and said inner surfaces of said tank together defining a further one of said transmission lines.

5. The arrangement of claim 1 wherein said means for measuring is responsive to the electromagnetic signal at one end of at least one of said transmission lines.

6. The arrangement of claim 5 wherein said means for measuring is responsive to the power level of said electromagnetic signal.

7. An arrangement according to claim 1 wherein said means for measuring is responsive to the electromagnetic signals at a first end and at an other end of at least one of said transmission lines.

8. The arrangement of claim 7 wherein said means for measuring is responsive to the relative power levels of the electromagnetic signals at said first and other ends.

9. The arrangement of claim 1 wherein said means for measuring comprises:

a source of electromagnetic signals coupled to a first end of at least one of said transmission line;

a terminating device coupled to an other end of said transmission lines and means responsive to the electromagnetic signal at one of the ends of said transmission line for providing an indication of said characteristic.

10. The arrangement of claim 9 wherein said means for providing an indication includes a directional coupler coupled between said transmission line and one of said source and device and a detector coupled to said directional coupler for providing said indication.

11. In a liquid storage container having a structure therein spaced apart from an inner surface of said container, wherein the absence of dominant gravitational forces a liquid stored in the container will tend to accumulate in the space between the structure and the inner surface,
an arrangement for measuring the amount of said liquid in the absence of dominant gravitational forces comprising:
an electromagnetic transmission line having a first conductor disposed on said inner surface and a second conductor formed on said structure, the field from said transmission line extending into said space;
means for coupling electromagnetic energy to said transmission line; and
means responsive to said coupled electromagnetic energy for measuring a characteristic of said transmission line which depends upon the presence or absence of liquid in said space.

12. The arrangement of claim 11 wherein said second conductor is along an edge of said structure that defines the space between the structure and the inner surface.

13. The arrangement of claim 11 further comprising at least one additional transmission line having a third conductor disposed in transmission line relation to said second conductor.

14. The arrangement of claim 13 wherein said second conductor is along an edge of said structure that defines the space between the structure and the inner surface, and said third conductor is substantially uniformly spaced apart from said second conductor.

15. The arrangement of claim 14 wherein said second and third conductors are substantially parallel.

16. The arrangement of claim 14 wherein said means for measuring comprises means responsive to the respective electromagnetic signals at a respective end of each of said transmission lines for providing an indication of said characteristic.

17. The arrangement of claim 14 wherein said second and third conductors comprise metallized strips formed on a dielectric layer that is affixed to said structure.

18. The arrangement of claim 17 wherein said dielectric layer is cut away in the region between said metallized strips.

* * * * *

UNITED STATES PATENT AND TRADEMARK OFFICE
CERTIFICATE OF CORRECTION

PATENT NO. : 4,994,749

DATED : February 19, 1991

INVENTOR(S) : Keith Davies et al.

It is certified that error appears in the above-identified patent and that said Letters Patent is hereby corrected as shown below:

Column 6, line 55, "line;" should be --lines;--.

Column 6, line 57, "lines and" should be --line; and--.

Column 6, line 68, after "wherein" insert --in--.

Signed and Sealed this

Fourth Day of August, 1992

Attest:

DOUGLAS B. COMER

Attesting Officer

Acting Commissioner of Patents and Trademarks